Patented Oct. 4, 1932

1,881,166

UNITED STATES PATENT OFFICE

OSWALD BEHREND, OF NITRO, WEST VIRGINIA, ASSIGNOR TO THE RUBBER SERVICE LABORATORIES CO., OF AKRON, OHIO, A CORPORATION OF OHIO

PROCESS OF VULCANIZING RUBBER AND PRODUCTS OBTAINED THEREBY

No Drawing.    Application filed December 13, 1929.    Serial No. 415,129.

The present invention relates to the vulcanization of rubber by an improved process whereby a vulcanized product of high quality is produced. More particularly the present invention relates to the vulcanization of rubber wherein the preferred class of compounds, for example a product obtained by reacting a chlorinated aldehyde-amine reaction product with a mercapto-benzo-thiazole or a salt thereof, is employed as a vulcanization accelerator.

One of the preferred class of materials was prepared in the following manner. Substantially one molar portion each of butyl aldehyde and aniline were reacted at a temperature preferably below 40° C. To the butyl aldehyde-aniline condensation product thus formed, substantially two molar portions (144 parts) of butyl aldehyde were stirred in as rapidly as possible, the reaction vessel was then closed tightly and agitation stopped and the reaction allowed to proceed under its own heat of reaction, preferably at 110° to 120° C. and a pressure of approximately five to ten pounds per square inch. After the initial reaction had subsided, the reaction mass was heated for substantially 40 hours at approximately 90° to 95° C. If convenient or desirable, a catalyst or condensing agent, for example an organic acid, may be added, with the second quantity of butyl aldehyde. On completion of the reaction as described, the water of condensation was separated from the product thus formed. Any side reaction products that may be present were removed preferably by steam distillation and chlorine passed into the residual product dissolved in an organic solvent, for example benzene, until saturation of the aldehyde-amine reaction product was completed. This reaction preferably takes place at approximately 15° to 25° C.

The chlorinated aldehyde-amine reaction product, after separation from the solvent employed, preferably by evaporation of the solvent therefrom, was reacted preferably in an alcoholic medium with an equivalent amount of the sodium salt of mercapto-benzo-thiazole preferably at approximately 50° to 60° C. An oil was thus formed, which, after washing first with an alkali, for example an aqueous sodium carbonate solution, then with water, and finally drying, was incorporated in a rubber stock comprising 100  parts of pale crepe rubber
      5  parts of zinc oxide
      3.5 parts of sulfur
      0.5 part of accelerator The rubber stock thus formed was then cured by heating in a press for different periods of time and at the temperature given by 40 pounds of steam pressure per square inch, that is 287° F. The cured stock on testing was found to have the following tensile characteristics:

Table I

| Time of cure | Modulus of elasticity in lbs/in² at elongations of— | | | Tensile at break in lbs/in² | Ultimate elongation per cent |
|---|---|---|---|---|---|
| | 300% | 500% | 700% | | |
| 15 mins. at 287° F | 366 | 933 | 3345 | 3635 | 710 |
| 30 mins. at 287° F | 297 | 970 | 3575 | 3905 | 720 |
| 45 mins. at 287° F | 294 | 1037 | 3810 | 4200 | 720 |

The data set forth in Table I show that the accelerator incorporated in the stock described, constitutes a member of an exceptionally efficient class of rubber vulcanization accelerators.

Another mode of operating the present invention comprises the following:

The reaction product of substantially three molecular proportions of acetaldehyde and substantially two molecular proportions of aniline, prepared as described in U. S. Patent 1,659,152 granted to Clayton Olin North February 14, 1928, was dissolved in an organic solvent, for example carbon tetrachloride and chlorine was passed thereinto at substantially 40° to 60° C. until saturation of the aldehyde-amine reaction product was complete. After separation of the carbon tetrachloride from the reaction product, preferably by evaporation or distillation, a solvent, preferably alcohol was added to the residual product and the chlorinated aldehyde amine product further reacted with an equivalent amount of an alkali metallic salt of mercapto-benzo-thiazole, preferably the sodium salt of mercapto-benzo-thiazole. The product thus formed, on separation from the solvent medium preferably by evaporation or distillation of the solvent therefrom, was washed first with a weak alkaline solution, for example an aqueous sodium carbonate solution and then with water to eliminate any unreacted mercapto-benzo-thiazole.

A portion of the material prepared as described was incorporated in the well known manner in a rubber stock comprising 100    parts of pale crepe rubber
    5    parts of zinc oxide
    3.5    parts of sulfur
    .8    parts of accelerator Samples of the compounded rubber stock, after curing by heating in a press for different periods of time at the temperature given by 40 pounds of steam pressure per square inch that is 287° F., on testing were found to possess the following tensile characteristics

*Table II*

| Time of cure | Modulus of elasticity in lbs/in² at elongations of— | | | Tensile at break in lbs/in² | Ultimate elongation per cent |
|---|---|---|---|---|---|
| | 300% | 500% | 700% | | |
| 10 mins. at 287° F | 194 | 511 | 1765 | 2518 | 770 |
| 20 mins. at 287° F | 226 | 577 | 2005 | 2835 | 763 |
| 30 mins. at 287° F | 233 | 615 | 2198 | 2928 | 758 |

Another of the preferred class of rubber vulcanization accelerators comprises the product formed by reacting a mercapto-benzo-thiazole with a chlorine derivative of a heptaldehyde-aniline condensation product. Thus to the product formed by combining substantially two molecular proportions of heptaldehyde with substantially one molecular proportion of aniline, chlorine was passed therein at a temperature of approximately 30° to 60° C. until saturation of the aldehyde-amine product was reached. The product thus formed was then reacted, preferably in an alcoholic solution, with an equivalent quantity of an alkali metallic salt of mercapto-benzo-thiazole, for example the sodium salt of mercapto-benzo-thiazole, by heating to approximately 50° to 70° C. On completion of the reaction, the sodium chloride formed was filtered off and the desired product separated from the filterate, preferably by the evaporation or distillation of the solvent therefrom. The residue, after washing first with an alkaline solution, preferably with an aqueous sodium carbonate solution, to eliminate any unreacted mercapto-benzo-thiazole and then with water, was dried and then incorporated in a rubber mix comprising 100    parts of pale crepe rubber
    5    parts of zinc oxide
    3.5    parts of sulfur
    .375    parts of accelerator The rubber stock thus formed after curing by heating in a press in the well known manner for different periods of time at the temperature given by 40 pounds of steam pressure per square inch, that is 287° F., on testing was found to possess the following tensile characteristics:

*Table III*

| Time of cure | Modulus of elasticity in lbs/in² at elongations of— | | Tensile at break in lbs/in² | Ultimate elongation per cent |
|---|---|---|---|---|
| | 300% | 500% | | |
| 10 mins. at 287° F | 338 | 1140 | 3075 | 650 |
| 20 mins. at 287° F | 385 | 1443 | 4240 | 680 |

From the examples set forth it is seen that the preferred class of materials exhibit desirable accelerating characteristics, causing a rubber composition of vulcanization characteristics in which they are incorporated, prior to the vulcanization thereof, to be cured in a short time and producing a rubber possessing high quality.

Other aldehyde-amine products than those hereinbefore set forth may be halogenated and reacted with a mercapto-benzothiazole and form further examples of the preferred class of rubber vulcanization accelerators. Thus anhydro formaldehyde-aniline, methylene dianilide, acrolein-aniline, heptaldehyde dianilide, butyl aldehyde-aniline, butyl aldehyde dianilide and analogous aldehyde-amine reaction products may be halogenated and further reacted with a mercapto-benzo-thiazole, for example the sodium salt of mercapto-benzo-thiazole and employed in a rubber composition of vulcanization characteristics in a manner similar to that hereinbefore set forth.

The present invention is limited solely by the claims comprising a part of the present specification, wherein it is intended to claim the invention as broadly as possible in view of the prior art.

What is claimed is:

1. A process of vulcanizing rubber comprising heating rubber and sulfur in the presence of a vulcanization accelerator comprising a reaction product of a mercapto-benzothiazole and a chlorinated aldehyde-amine product, said amine comprising an aromatic hydrocarbon wherein one or more hydrogen atoms are substituted by amino groups only.

2. A process of vulcanizing rubber comprising heating rubber and sulfur in the presence of a vulcanization accelerator comprising a reaction product of a mercapto-benzothiazole and a chlorinated aliphatic aldehyde-primary aromatic amine reaction product containing a single benzene nucleus.

3. A process of vulcanizing rubber comprising heating rubber and sulfur in the presence of a vulcanization accelerator comprising a reaction product of a mercaptobenzothiazole and a chlorine derivative of an aliphatic aldehyde-aniline reaction product.

4. A process of vulcanizing rubber comprising heating rubber and sulfur in the presence of a vulcanization accelerator comprising a reaction product of a mercaptobenzothiazole and a chlorine derivative of a condensation product of an aliphatic aldehyde containing less than eight carbon atoms and aniline.

5. A process of vulcanizing rubber comprising heating rubber and sulfur in the presence of a vulcanization accelerator comprising a reaction product of a mercaptobenzothiazole and a chlorine derivative of a reaction product of substantially three molecular proportions of an aliphatic aldehyde containing less than eight carbon atoms and substantially one molecular proportion of aniline.

6. A process of vulcanizing rubber comprising heating rubber and sulfur in the presence of a vulcanization accelerator comprising a reaction product of a mercaptobenzothiazole and a chlorine derivative of a reaction product of substantially three molecular proportions of butyl aldehyde and substantially one molecular proportion of aniline.

7. A process of vulcanizing rubber comprising heating rubber and sulfur in the presence of a vulcanization accelerator comprising a reaction product of the sodium salt of mercaptobenzothiazole and a chlorine derivative of a reaction product of substantially three molecular proportions of butyl aldehyde and substantially one molecular proportion of aniline.

8. A vulcanized rubber product prepared by heating rubber and sulfur in the presence of a vulcanization accelerator comprising a reaction product of a mercaptobenzothiazole and a chlorinated aldehyde-amine product, said amine comprising an aromatic hydrocarbon wherein one or more hydrogen atoms are substituted by amine groups only.

9. A vulcanized rubber product prepared by heating rubber and sulfur in the presence of a vulcanization accelerator comprising a reaction product of a mercaptobenzothiazole and a chlorinated aliphatic aldehyde-primary aromatic amine reaction product containing a single benzene nucleus.

10. A vulcanized rubber product prepared by heating rubber and sulfur in the presence of a vulcanization accelerator comprising a reaction product of a mercaptobenzothiazole and a chlorine derivative of an aliphatic aldehyde-aniline reaction product.

11. A vulcanized rubber product prepared by heating rubber and sulfur in the presence of a vulcanization accelerator comprising a reaction product of a mercaptobenzothiazole and a chlorine derivative of a reaction product of an aliphetic aldehyde containing less than eight carbon atoms and aniline.

12. A vulcanized rubber product prepared by heating rubber and sulfur in the presence of a vulcanization accelerator comprising a reaction product of a mercaptobenzothiazole and a chlorine derivative of a reaction product of substantially three molecular proportions of an aliphatic aldehyde containing less than eight carbon atoms and substantially one molecular proportion of aniline.

13. A vulcanized rubber product prepared by heating rubber and sulfur in the presence of a vulcanization accelerator comprising a reaction product of a mercaptobenzothiazole and a chlorine derivative of a reaction product of substantially three molecular proportions of butyl aldehyde and substantially one molecular proportion of aniline.

14. A vulcanized rubber product prepared by heating rubber and sulfur in the presence of a vulcanization accelerator comprising a reaction product of the sodium salt of mercaptobenzothiazole and a chlorine derivative of a reaction product of substantially three molecular proportions of butyl aldehyde and substantially one molecular proportion of aniline.

15. A process of vulcanizing rubber comprising heating rubber and sulfur in the presence of a vulcanization accelerator comprising a product prepared by reacting substantially equimolecular proportions of the sodium salt of mercaptobenzothiazole and a chlorine derivative of a reaction product of substantially three molecular proportions of butyl aldehyde and substantially one molecular proportion of aniline.

16. A vulcanized rubber product prepared by heating rubber and sulfur in the presence of a vulcanization accelerator comprising a product prepared by reacting substantially equimolecular proportions of the sodium salt of mercaptobenzothiazole and a chlorine derivative of a reaction product of substantially three molecular proportions of butyl aldehyde and substantially one molecular proportion of aniline.

In testimony whereof I hereunto affix my signature.

OSWALD BEHREND.